United States Patent [19]

Dixit et al.

[11] 4,256,703

[45] Mar. 17, 1981

[54] FLY ASH COLLECTION

[75] Inventors: Shyam N. S. Dixit; Douglas I. Bain, both of Cincinnati, Ohio; David A. Carter, Barrington, Ill.

[73] Assignee: Chemed Corporation, Cincinnati, Ohio

[21] Appl. No.: 107,400

[22] Filed: Dec. 26, 1979

Related U.S. Application Data

[63] Continuation-in-part of Ser. No. 521,610, Nov. 17, 1978, abandoned, which is a continuation-in-part of Ser. No. 437,750, Sep. 20, 1978.

[51] Int. Cl.$^3$ .......................... C01G 1/02; B01D 45/00
[52] U.S. Cl. ........................................ 423/23; 423/25; 423/53; 423/62; 423/69; 423/87; 423/99; 423/100; 423/111; 423/113; 423/138; 423/155; 423/156; 423/215.5; 423/244; 423/508; 44/5; 55/5; 110/344; 110/345
[58] Field of Search ................... 55/5; 44/5; 110/342, 110/344, 345, 347, 348; 423/1, 23, 25, 53, 62, 87, 99, 100, 111, 113, 138, 155, 156, 69, 508, 215.5, 244 A, 244 R

[56] References Cited

U.S. PATENT DOCUMENTS

| | | | |
|---|---|---|---|
| 3,249,075 | 5/1966 | Nelson et al. | 110/1 |
| 3,547,583 | 12/1970 | Wilson | 423/225 |
| 3,579,293 | 5/1971 | Schulz et al. | 423/231 |
| 3,665,676 | 5/1972 | McKewen | 55/5 |
| 3,689,213 | 9/1972 | Guerrieri | 55/5 |
| 3,720,754 | 3/1973 | Wilson | 423/244 |
| 3,837,820 | 7/1974 | Kukin et al. | 44/5 |
| 3,851,042 | 11/1974 | Minnick | 423/244 A |
| 3,886,261 | 5/1975 | Libutti | 423/244 |
| 4,042,348 | 8/1977 | Bennett et al. | 55/5 |
| 4,058,587 | 11/1977 | Nelson | 423/220 |
| 4,062,926 | 12/1977 | Knight | 423/244 A |
| 4,070,162 | 1/1978 | Kober et al. | 55/5 |
| 4,115,518 | 9/1978 | Delman et al. | 423/244 |

FOREIGN PATENT DOCUMENTS

| | | | |
|---|---|---|---|
| 610679 | 12/1960 | Canada | 252/457 |
| 1272897 | 7/1968 | Fed. Rep. of Germany | 252/457 |
| 1009191 | 11/1965 | United Kingdom | 423/244 |

OTHER PUBLICATIONS

Radway, "Effectiveness of Fireside Additives in Coal-Fired Boilers", Power Engineering, Apr. 1978, pp. 72–86.

*Primary Examiner*—Earl C. Thomas
*Attorney, Agent, or Firm*—Charles L. Harness

[57] ABSTRACT

To a coal-fired furnace that uses electrostatic precipitation or a mechanical collector to collect fly ash, a mix of magnesia-alumina or magnesia-talc is added above the fireball (2600°–3300° F.). The additive increases the mean particle size of the fly ash and reduces its surface resistivity, thereby causing improved collection in the electrostatic precipitators or mechanical collector. Fine particulates containing heavy metals tend to be agglomerated; thus the invention permits recovery of substantial amounts of heavy metal contaminants that would otherwise be lost as stack emission.

19 Claims, No Drawings

FLY ASH COLLECTION

This application is a continuation-in-part of our co-pending Ser. No. 521,610 filed Nov. 17, 1978, now abandoned, which is a continuation-in-part of our Ser. No. 437,750, filed Sept. 20, 1978.

This invention is directed to improving the recovery of dust particles in utility furnaces systems with electrostatic precipitators or with a mechanical collection system and is applicable especially to systems that burn coal. The use of the invention increases the mean size of the fly ash dust particles while simultaneously reducing their resistivity. The over-all consequence is an improved collection of the particles in the precipitator or other collector and a substantial reduction in stack emission.

One conventional way of collecting dust particles from a furnace gas stream in which the particles are entrained is by the use of an electrostatic precipitator. This equipment separates particles from a gas stream by passing the stream through an electric field, thereby attracting the charged particles to a collector plate. The particles are then removed from the plate by mechanical vibration or rapping the plate. There are a number of variables that can adversely affect the removal of fly ash by an electrostatic precipitator. Many of these variables can be eliminated by mechanical means, e.g., correction of poor gas distribution or by improved mechanical rapping to keep precipitator collection surfaces in a cleaner condition. However, chemical means of control have been utilized primarily as resistivity modifiers. Sulfur trioxide, ammonium sulfate and bisulfate, ammonia, and sulfamic acid are some of the most common additives for this purpose.

Mechanical collecting systems such as cyclone separators are also utilized to separate dust particles from a furnace gas stream. In this case, the resistivity plays a minor role in determining the efficiency of the separation. Size and density of the particles are most important.

This invention is effective for both types of separating systems. For electrostatic precipitators, the sulfur content of the coal is the predominant factor in determining fly ash resistivity without the use of additives. Low sulfur coal containing less than 1% sulfur produces particles of high resistivity, i.e., above $10^{11}$ ohm-centimeters, whereas coals with greater than 1.5% sulfur produce resistivities lower than $10^{10}$ ohm-centimeters. Resistivities of $10^8$–$10^{10}$ ohm-centimeters are considered optimum for most efficient fly ash removal.

Whereas fly ash resistivity is the most significant factor governing fly ash precipitation, particle size also plays an important role. Particles in the 10 micron range and above give more efficient operation than smaller sized particles. Various explanations of this phenomenon have been proposed, but none are totally satisfactory. It is our opinion that with larger particles, two effects occur, first there is a lower surface area to bulk volume of fly ash and the electrical resistivity is concentrated at the surface of the particles in a typical exhaust stream, thus reducing surface resistivity. Secondly, larger particles are more readily centrifuged from the flue gas stream than smaller particles. The modification of particle size coupled with chemical modification of the fly ash resistivity when necessary is the basis of this invention.

SUMMARY OF THE INVENTION

It has been found that feeding certain additives above the fireball of a coal-fired furnace directly into the particle laden gas stream at a temperature of between 2600° F. and 3300° F. at a rate of 0.05 lbs. to 10 lbs. per ton of coal burned, will increase the size of the fly ash particles, which in turn improves the efficiency of mechanical or electrostatic methods of separation. The additive required is a mixture of magnesia with either alumina or talc. The weight ratio of $MgO:Al_2O_3$ or MgO:talc, as the case may be, is suitably 1–10:1–10, and preferably the additive is added at a zone of the furnace where the temperature is about 3000° F., and at a feed rate of 0.1–? lbs./ton of coal burned. Preferably the additive is ground or finely divided, e.g., typically 5–7 microns.

It is recognized that certain coals containing low sulfur (e.g., less than 1% S) will provide a fly ash with too high a resistivity for effective removal in an electrostatic precipitator. Using the above described additive alone will not improve removal in these cases. However, when using low sulfur coals the aforesaid additive works efficiently if supplemented by a second additive, which modifies the fly ash resistivity. The second additive is selected from many known compounds for electrostatic precipitator application including sulfur trioxide, ammonium sulfate or bisulfate, ammonia, sulfamic acid, and urea. This second additive is applied under conditions known in the prior art for such additive.

The combination of simultaneously increasing the particle size and modifying the fly ash resistivity is believed to be a unique and novel approach to fly ash conditioning.

It is known to add magnesia in oil in an oil-fired furnace (U.S. Pat. No. 3,837,820, Example 1). It would be expected that some of this MgO would survive and enter the gas stream above the fire ball, and that some would fall below to the furnace floor, where it would have to be collected and drawn off. The use of coal is apparently contemplated only under conditions of gas recycle. (Column 11, line 68.) The instant invention differs in that (a) it does not use MgO except with alumina or talc and (b) it adds the additive above the fire ball at a very specific temperature zone (2600°–3300° F.), with coal-fired furnaces, and does not require gas recycle. We have established, as a matter of fact, that addition of $MgO \cdot Al_2O_3$ (1:1) at 2300° F. or below is inoperative with coal, as shown in Table 1.

TABLE 1

| | Particle Size Distribution with and without Additive (1:1, $MgO \cdot Al_2O_3$) | | | | |
|---|---|---|---|---|---|
| | Particle Size % without Additive | Particle Size % with Additive Temp.1900–2100° F. | | Particle Size % with Additive Temp.2100–2300° F. | |
| Size Range, Microns | Composite of Hoppers | No. 1 Hopper | No. 7 Hopper | No. 1 Hopper | No. 7 Hopper |
| Less than 4.5 | 80% | 40% | 40% | 40% | 40% |
| 5–10 | 20% | 60% | 60% | 60% | 60% |

The following examples illustrate without limiting the invention.

EXAMPLE 1

A 120 megawatt designed capacity boiler burning Eastern Bituminous C coal, equipped with three cyclones, was being considered for discontinuing fly ash reinjection, which was causing increased particulate emissions and putting the unit out of compliance. The rate of particulate emissions from the unit acceptable to regulating agencies was 0.274 pounds per million BTU of heat input. To lower the rate of particulate emission a powdered mixture containing 50 percent by weight magnesium oxide and 50 percent by weight aluminum oxide was injected into the high temperature zones (2600° to 3100° F.) of the boiler. The solids injection equipment used is described below.

The effect of the additive injection rate on the rate of particulate emission from 120 megawatt unit is recorded in Table 2.

TABLE 2

| Additive Injection Rate lbs./ton of coal | Emissions lbs./million BTU |
|---|---|
| None | 0.4 to 0.5 |
| 2.0 | 0.37 to 0.57 |
| 1.0 | 0.3 to 0.29 |
| 0.8 | 0.269 |

Samples of fly ash were collected from electrostatic precipitator hoppers for measuring fly ash particle size. Particle size distribution data without additive injection (control) and with additive injection (this invention) are given in Table 3.

The percent opacity, as determined on stack transmissometer, decreased from 35 to 40 percent to 20 to 25 percent.

TABLE 3
FLY ASH PARTICLE SIZE DISTRIBUTION

| Particle Size (Microns) | Normal Fly Ash Without Additive |
|---|---|
| 5–10 | 20% |
| Less than 4.5 | 80% |

| Particle Size (Microns) | Fly Ash from Precipitator Hoppers with Additive |
|---|---|
| 106 | 74.4% |
| 53 | 25.0% |
| 20 | 0.5% |
| 5 | 0.1% |
| Less than 5 | — |

EXAMPLE II

A 330 megawatt rating boiler burning Eastern Bituminous C coal, equipped with seven cycles, was barely meeting compliance standards of 0.274 pounds of particulate per million BTU of heat input. The problem was diagnosed as a very small fly ash particle size due to routing practice of fly ash reinjection. To lower the rate of particulate emission, a powdered mixture containing 50 percent by weight magnesium oxide and 50 percent by weight aluminum oxide was injected into the high temperature zones (2600° to 3100° F.) of the boiler. Emission tests were found to be within compliance; and fly ash particle size, as illustrated in Table 4, increased significantly.

TABLE 4
FLY ASH PARTICLE SIZE DISTRIBUTION

| Particle Size (Microns) | Normal Fly Ash Without Additive |
|---|---|
| 5–10 | 20% |
| Less than 4.5 | 80% |

| Particle Size (Microns) | Fly Ash with Reinjection with Additive |
|---|---|
| 106 | 28.00% |

TABLE 4-continued
FLY ASH PARTICLE SIZE DISTRIBUTION

| 53 | 12.00% |
|---|---|
| 20 | 58.00% |
| 5 | 2.00% |
| Less than 5 | — |

Another advantage of the use of our invention is that it tends to collect toxic metal contaminants which would otherwise be emitted as fine particulate matter up the stack. Preliminary studies indicate that 50–75% of these toxic heavy metal contaminants are recovered by the use of this invention. Such metals include Cu, As, V, Zn, Hg, Se, Be, Ba, Cr, and others. As shown in the following table, heavy metal values are particularly concentrated in the smaller particulates, which this invention agglomerates with efficiency, thereby facilitating recovery of these heavy metals. The metals are of course not recovered in metallic form, but as compounds, e.g., silicates, oxides, or salts.

Data in the following Table 5 were obtained by collecting fly ash agglomerated by the process of this invention, and screening the product in a sonic sifter into the screen fractions indicated, whereby the original fly ash particles can be chemically analyzed in given screen fraction.

TABLE 5
CHEMICAL COMPOSITION OF FRACTIONATED FLY ASH SAMPLES FROM PULVERIZED COAL FURNACE

| No. | Chemical Wt. % | 5 Micron Fraction | 20 Micron Fraction | 53 Micron Fraction | 106 Micron Fraction |
|---|---|---|---|---|---|
| 1 | Copper as CuO | 0.3 | none | none | none |
| 2 | Iron as $Fe_2O_3$ | 14.3 | 6.7 | 7.0 | 8.0 |
| 3 | Calcium as CaO | 17.5 | 14.8 | 15.6 | 11.6 |
| 4 | Potassium and $Na_2O$ as $K_2O$ | 0.8 | 0.4 | 0.3 0.6 | 0.1 1.1 |
| 5 | Sulfates as $SO_3$ | 2.8 | 3.5 | 6.2 | 9.0 |
| 6 | Phosphorus as $P_2O_5$ | 1.2 | 0.6 | 0.5 | 0.1 |
| 7 | Silica as $SiO_2$ | 38.3 | 49.0 | 32.7 | 29.7 |
| 8 | Aluminum as $Al_2O_3$ | 13.0 | 12.0 | 15.0 | 10.1 |
| 9 | Magnesium as MgO | 4.1 | 4.6 | 3.8 | 1.4 |
| 10 | Vanadium as $V_2O_5$ | 0.4 | none | 0.1 | 1.1 |
| 11 | Titanium as $TiO_2$ | 0.6 | none | none | none |
| 12 | Strontium as SrO | 1.7 | none | none | none |
| 13 | Carbon and $H_2O$ | 0.9 | 4.4 | 15.9 | 27.8 |
| 14 | Undetermined | 4.1 | 3.6 | 2.3 | 1.1 |

EXAMPLE III

In this series, a 1:1 (by weight) mixture of MgO:talc was used. The mix was ground to substantially 5–7 microns. Talc is a complex magnesium silicate. The structure may vary somewhat, but it is typically $Mg_3Si_4O_{10}(OH)_2Fe_2O_3$. This additive was added above the fire ball (at about 2600°–3100° F.) in a 388 megawatt utility boiler using pulverized coal as fuel and equipped with electrostatic precipitators. Runs were made with and without additive, and samples of fly ash particles were collected at the inlets and outlets of the electrostatic precipitators. As shown in the data (Table 6) use of the additive caused remarkable particle growth.

TABLE 6

| Control (No Additive) | | |
|---|---|---|
| Stage, μ | Outlet, Electrostatic Precipitator Hopper Wt. % retained | Inlet, Electrostatic Precipitator Hopper Wt. % retained |
| 106 | 6.12 | 10.79 |
| 53 | 21.33 | 20.79 |
| 20 | 43.50 | 46.38 |
| 9 | 29.00 | 22.36 |
| <5 | 0.05 | 0.04 |

| Additive 1:1 MgO:talc, 1 lb. per ton of fuel | | |
|---|---|---|
| Stage, μ | Outlet, Electrostatic Precipitator Hopper Wt. % retained | Inlet, Electrostatic Precipitator Hopper Wt. % retained |
| 106 | 47.11 | 14.52 |
| 53 | 23.67 | 23.43 |
| 20 | 27.29 | 53.45 |
| 5 | 1.92 | 8.53 |
| <5 | 0.004 | 0.06 |

SOLIDS ADDITION APPARATUS

In the above example three water-cooled probes were used to inject the powder into the furnace. The probes were about 5 feet long and consisted of 3 concentric tubes made of 3/16" stainless steel. The outer tube was 2.5 inches outer diameter, the middle tube 2 inches, the center tube 1 inch. Water flows down the annulus formed by the outer and middle tubes and returns via the annular formed by the middle and center tubes. There is about 0.277 inches clearance between the terminus of the outer tube and the terminus of the middle tube to permit water return. Water is introduced in the front end of the outer tube, outside the boiler. The incoming flow is lateral, so that the water spins tangentially on its way down the tube. The powdered additive is taken off a hopper with a screw feeder which meters the powder into an air conveying system, which delivers the powder to the center tube of the probe. The air flow helps cool the center tube and may also contribute to cooling the water jacketed areas of the probe.

In the above data, percentages are weight percent. Following the convention for measuring particle sizes, a given sieve fraction gives the weight percent of the material having that stated size or larger. For example, in Table 3, the value 74.4% means that of the total fly ash, 74.4% consisted of particles that were too big to pass a 106 micron screen, i.e., they were 106 microns or larger in effective diameter; 25% means of 25% of the total passed through the preceding screen(s) but was retained on the 53 micron screen, and so on. The total of all the fractions adds to 100%.

We claim:

1. Method of improving the collection characteristics of particles entrained in a stream of particle-laden gas formed by burning coal comprising feeding an additive to the particle-laden gas at a temperature of 2600° to 3300° F., above the fireball, and at a rate of 0.05 lbs-10 lbs. per ton of coal burned; said additive consisting essentially of a mixture of magnesia with alumina or talc.

2. Method according to claim 1 where the particle-laden gas is at a temperature of about 3000° F.

3. Method according to claim 1 where the additive feed is at a rate of 0.1 to 2 lbs. per ton of coal burned.

4. Method according to claim 1 where the weight ratio of MgO:alumina or talc is 1-10:1-10.

5. Method according to claim 4 where the ratio is 1:1.

6. Method according to claim 5 in which the additive is a mixture of magnesia and alumina.

7. Method according to claim 5 in which the additive is a mixture of magnesia and talc.

8. Method according to claim 1 in which the coal burned is low sulfur coal, and in which a second additive is added to the particle laden gas; said second additive being selected from the group consisting of ammonium sulfate, ammonium bisulfate, sulfamic acid, ferrous ammonium sulfate, urea, or sulfur trioxide.

9. The method of recovering heavy metal values in a coal-burning utility boiler system, said system carrying particles entrained in a stream of particle laden gas, comprising feeding an additive to the particle laden gas at a temperature of 2600° to 3300° F., above the fireball, and at a rate of 0.05 pounds-10 pounds per ton of coal burned; said additive consisting essentially of a mixture of magnesia with alumina or talc; whereby the finer particulates, carrying said heavy metal values, agglomerate into larger particulates, and said larger particulates are collected before reaching the stack.

10. Method according to claim 9 where the particle-laden gas is at a temperature of about 3000° F.

11. Method according to claim 9 where the additive feed is at a rate of 0.1 to 2 lbs. per ton of coal burned.

12. Method according to claim 9 where the weight ratio of magnesia:alumina or talc is 10:1 to 1:10.

13. Method according to claim 12 where the ratio is 1:1.

14. Method according to claim 13 in which the additive is a mixture of magnesia and alumina.

15. Method according to claim 13 in which the additive is a mixture of magnesia and talc.

16. Method according to claim 9 in which the coal burned is low sulfur coal, and in which a second additive is added to the particle laden gas; said second additive being selected from the group consisting of ammonium sulfate, ammonium bisulfate, sulfamic acid, ferrous ammonium sulfate, urea, or sulfur trioxide.

17. The method according to claim 9 in which the agglomerated particulates contain heavy metal contaminants.

18. The method according to claim 17 in which the heavy metal is at least one metal selected from the group consisting of Cu, Fe, V, Ti, Sr, As, Hg, Se, Be, Ba, or Cr.

19. The method according to claim 17 in which the metal is at least one metal selected from the group consisting of Cu, Fe, V, Ti, or Sr.

* * * * *

UNITED STATES PATENT AND TRADEMARK OFFICE
CERTIFICATE OF CORRECTION

PATENT NO. : 4,256,703

DATED : March 17, 1981

INVENTOR(S) : Shyam N. S. Dixit et al.

It is certified that error appears in the above—identified patent and that said Letters Patent is hereby corrected as shown below:

On the title page, Item [63] should read:

--- Continuation-in-part of Ser. No. 952,161, Oct. 17, 1978, abandoned, which is a continuation-in-part of Ser. No. 943,775, Sep. 20, 1978, abandoned. ---

Signed and Sealed this

Second Day of June 1981

[SEAL]

Attest:

RENE D. TEGTMEYER

*Attesting Officer*    *Acting Commissioner of Patents and Trademarks*